United States Patent [19]

Hwang

[11] Patent Number: 5,060,080
[45] Date of Patent: Oct. 22, 1991

[54] SELF MULTI-COPY METHOD IN A FACSIMILE SYSTEM

[75] Inventor: Hyo-Hyun Hwang, Kyounggi, Rep. of Korea

[73] Assignee: SamSung Electronics Co., Ltd., Suwon, Rep. of Korea

[21] Appl. No.: 359,273

[22] Filed: May 31, 1989

[30] Foreign Application Priority Data

Feb. 28, 1989 [KR] Rep. of Korea ............................ 2475

[51] Int. Cl.$^5$ ............................................. H04M 1/00
[52] U.S. Cl. .................................... 358/401; 358/402; 358/498
[58] Field of Search ........................ 358/401, 402, 498

[56] References Cited

U.S. PATENT DOCUMENTS 4,415,981 11/1983 Cutter et al. .......................... 358/402
4,723,172 2/1988 Matsumoto .......................... 358/498

Primary Examiner—Edward L. Coles, Sr.
Attorney, Agent, or Firm—Robert E. Bushnell

[57] ABSTRACT

There is disclosed a self multi-copy method in a facsimile system capable of making at least one copy of the contents of each inserted document. The inventive method comprises: displaying a first message to have the desired amount of the pages set; displaying a second message to have the document loaded; conveying the document into a scanning position; detecting whether another document is inserted or not; repeating the execution from the step of conveying the document into scanning position when another document is detected at the previous step; outputting the amount of one page of the coded data from the memory; decreasing the stored contents in a register; an eight step for decreasing the set value of the copy number by one; and clearing the data in the memory and moving to a stand-by mode.

13 Claims, 3 Drawing Sheets

SELF MULTI-COPY METHOD IN A FACSIMILE SYSTEM

BACKGROUND OF THE INVENTION

The present invention relates to a method for copying a document in a facsimile system, and in particular to a self multi-copy method.

A facsimile is generally a communication appliance which scans the contents of a document, decomposes the scanned signal into picture elements to convert the signal to an electric data and then transmits the data to another facsimile, which receives the data transmitted from above and restores it into an original document. A facsimile has various additional functions other than transmitting of pictures or documents of its own function, according to the developement of communication and electronic industries, for example, a multi-address calling function, automatic dialing function, copying function, transmitting/receiving reporting function for the management of facsimile status and various other functions.

Heretofore, according to the document copying method of a facsimile, when copy execution data, caused by pressing the key for copying, is detected under the insertion of the document in predetermined state, the facsimile system scans the contents of the inserted document to convert it into an electric signal. The facsimile system in which the contents of a document is converted to an electric signal executes the coding and decoding process by digitizing the electrically converted signals, and the decoded signal is outputted to a recording device within the facsimile system, so that the printing operation is executed. When the insertion of another document is detected in copy mode after the execution of said operation, the same operation executed above is repeated to print out the contents of the inserted document.

However, the conventional copying method of the facsimile system, operating as above, has been giving users great inconvenience in the case of several duplications of the contents of one document because it is limited to the single-page copy of a document. Therefore, there is a disadvantage with the conventional method, for example, when many copies of each document are required, the user must repeat the above process one time for each copy desired.

SUMMARY OF THE INVENTION

Therefore, it is an object of the present invention to provide a multi-copy method capable of making at least one copy of the contents of each inserted document in a facsimile system.

To meet rising need to remove the inconvenience of the prior art and improve its function, in order to attain the goal of the object, the inventive method coprises the steps of: displaying a first message to have the desired amount of the pages set; displaying a second message to have the document loaded; conveying the document onto a scanning position; detecting whether another document is inserted or not; repeating the execution from the third step of conveying the document onto scanning position when another document is detected outputting the amount of one page of the coded data from the memory if no other document is detected decreasing the stored contents in a register decreasing the set value of the copy number by one after decreasing the contents in the register; and clearing the data in the memory and moving to the stand-by mode.

BRIEF DESCRIPTION OF THE DRAWINGS

The forgoing and other objects as well as advantages of the present invention will now become clear through the use of the following description of the present invention with reference to the accompanying drawings, wherein.

DETAILED DESCRIPTION OF THE INVENTION

Hereinafter, the invention will be described in detail with reference to the accopanying drawings.

Figure 1:
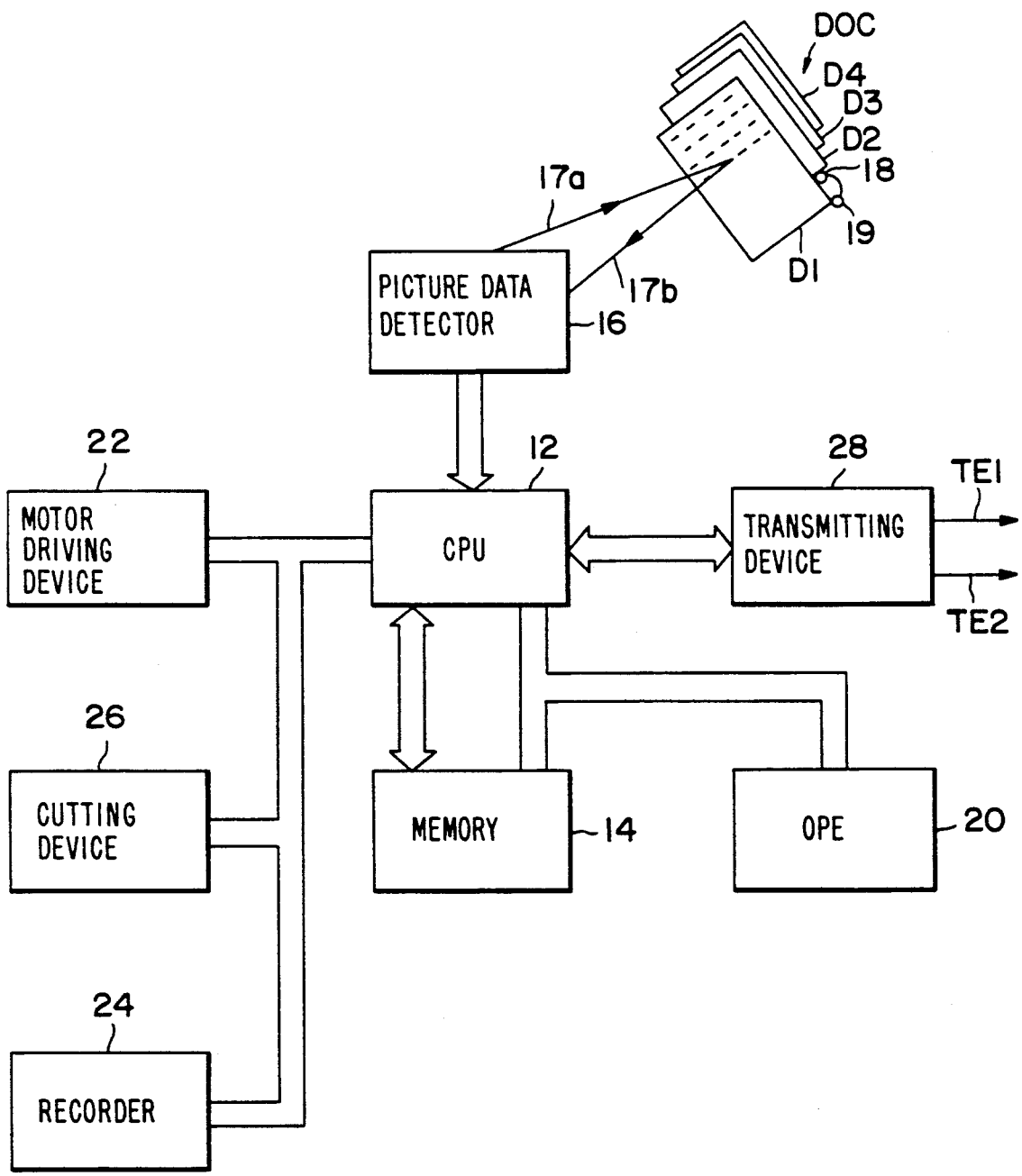
FIG. 1 is a block diagram illustrating schematically a facsimile system suitable for carrying out the present invention.

FIG. 1 is a block diagram illustrating a facsimile system, suitable for carrying out the present invention, containing a central processing unit 12 (hereinafter called CPU) for controlling the data inputted and outputted by a predetermined control and the various operations of the system; a memory 14 for providing a program and for accessing data under the control of the CPU 12; a document detecting sensor 18 for detecting the insertion of a document DOC containing a letter or a picture of intermedial tone and providing it to the CPU 12; a picture data detecting means 16 for scanning, comparing the light quantity with a level of reference light quantity, quantizing into binary information, and producing the document as picture data; an operating pannel 20 (OPE) having a predetermined number of operating keys and display devices, and for either inputting the key data by key pressing it into the CPU 12 or displaying the data by inputting the display data of the CPU 12; a motor driving device 22 for driving a motor (not shown) for conveying a document (DOC) according to the data of the CPU 12; a recorder means 24 for printing the decoding data outputed from and under the control of the CPU 12; a cutting device 26 for cutting recording paper within said recording device 24 under the control of the CPU 12; and a transmitting device 28 for transmitting to the telephone lines TE 1 and TE 2 under the control of the CPU 12 and by modulating the output data from the CPU.

Figure 2A:
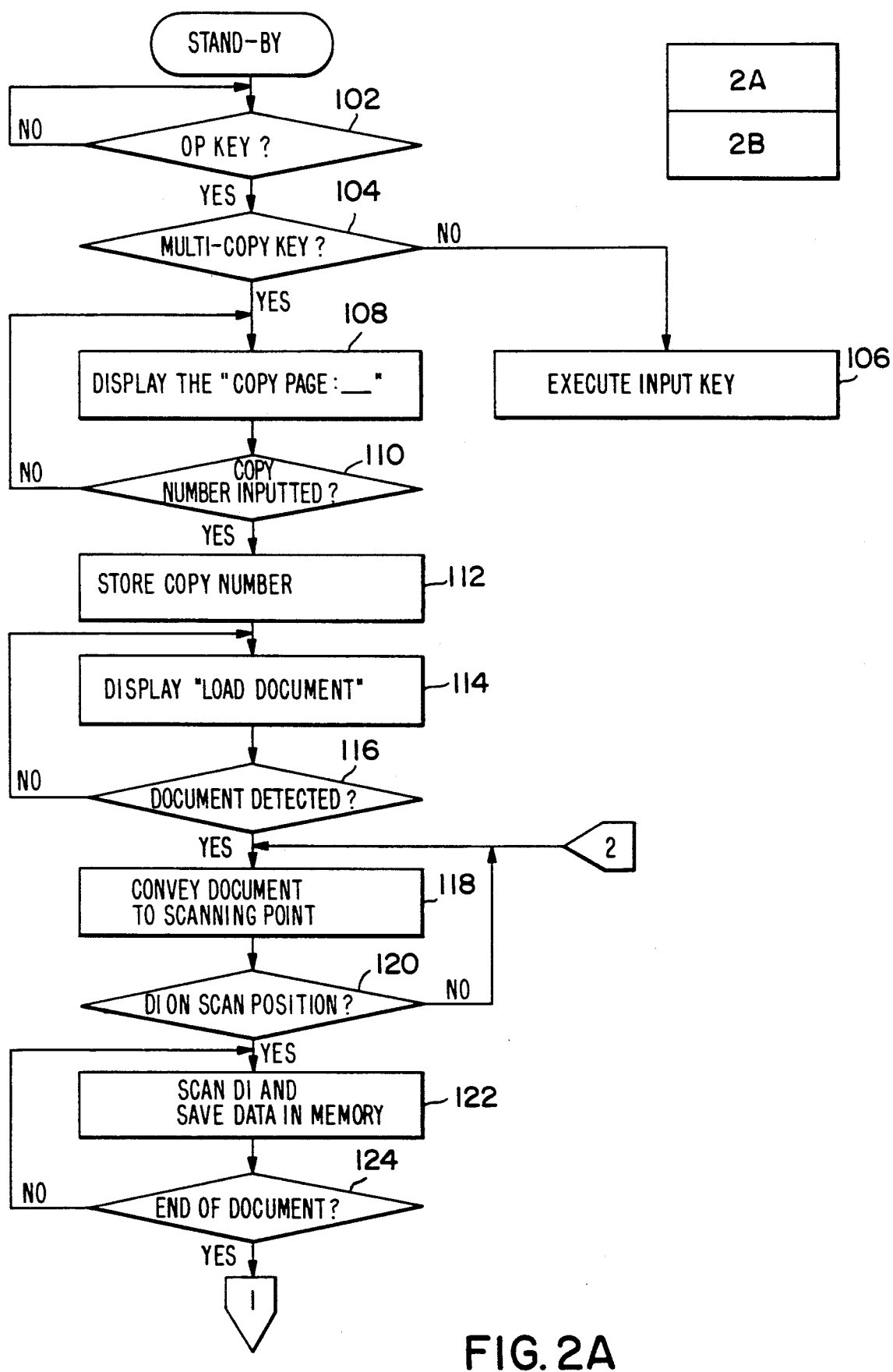
FIGS. 2 A-B are flow charts representing a self multi-copy method according to the present invention.
Figure 2B:
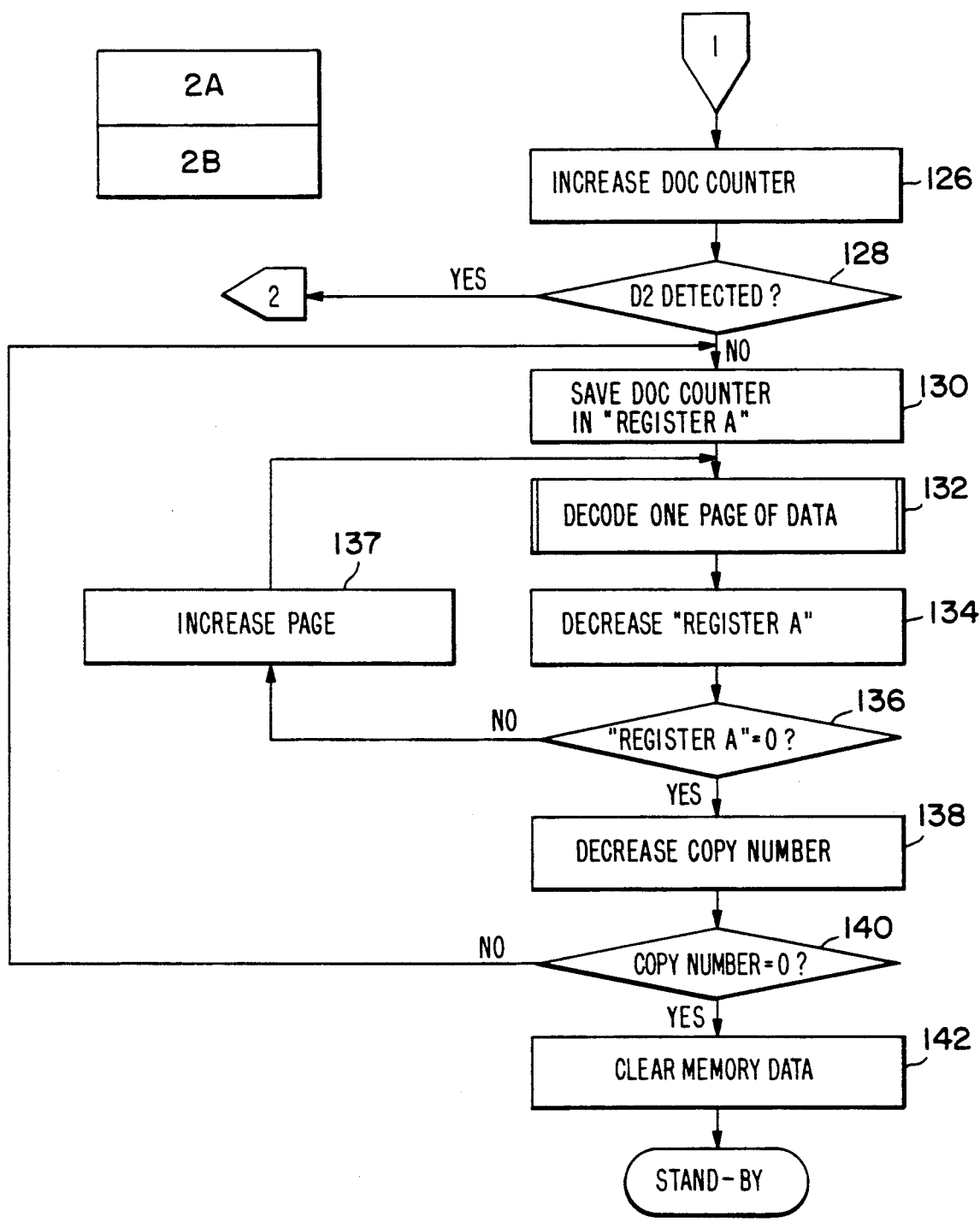

FIG. 2 is a flow chart representing a self multi-copy method according to the present invention, which is carried out by the sequential procedure below. The inventive method comprises the steps of: a first process which displays a first message informing a user to set the desired number of copies when a multi-copy key is inputted to the stand-by state, and detects if the desired number of pages is set; a second process for displaying a second message which orders saving of the page numbers inputted upon the page numbers being set in a predetermined memory region and to load a document until the document is detected by a detecting sensor 18; a third process which conveys the document into a scanning position upon detecting the document at the second process and, thereafter, scans the documents to decode and store the data into the memory by the page, and detects whether or not it is the end of the document; a fourth process which increases a document counter by one when the end of the document is detected at the third process, and detects whether or not another document is inserted; a fifth process which repeats the same process as above from the conveying steps of document scanning of the third process when another document is detected as a detected result at the fourth process, and which saves the contents of the document counter to a register when another document is not present; a sixth process for accessing one page of data from the memory after completing said fifth process; a seventh process for decresing, by one, the stored contents in the register of the fifth process, and repeating the same process as above until the value of the register equals "0"; an eighth process which decreases the numbers of copies value by one after the completion of the seventh process, and detects whether or not the result of process is "0"; and a ninth process which saves the contents of the document counter counted at the fourth process to the register when the detected result of the eighth process is not "0", repeats the same process in the sixth process, then clears the data of the memory when the result of the process is "0", and moves to the stand-by mode.

Hereinafter, the preferred embodiment of the present invention will be described in detail with reference to the block diagram of FIG. 1 and the flow chart of FIG. 2.

Now, with the PIP system in the stand-by state of FIG. 2, the central processing unit 12 detects whether or not operation key data (OP key) is inputted from the OPE 20 at a step 102 of FIG. 2. The stand-by state herein means a recommended stand-by state by CCITT regulation. When the OP key is inputted by the operating action of a user at step 102, it is detected whether or not the inputted key is a multi-copy key at a step 104. When the detected result of step 104 is not multi-copy key, the function of the inputted key is executed in a step 106. The operating function with respect to the key input in a step 106 includes a document transmitting and receiving, transmitting a report and receiving a report output, and time setting.

When it is judged in step 104, the detected result is a multi-copy key the CPU 12 displays, on the displaying means of OPE 20, a first message "copy pages:—" of deciding the copy numbers for each inserted document according to the internal program in step 108 of FIG. 2. The CPU 12 executing step 108 of FIG. 2 detects whether or not the desired number of copies is inputted by scanning the output data of OPE 20 at step 110. When the user presses an operating key within the OPE 20, the data is transferred to the CPU 12, and is judged that a desired copy number is inputted by this operation in step 110. The CPU 12 stores the copy numbers inputted in step 110 to a predetermined region of the memory 14, and sets the copy numbers of the document to be inputted in step 112.

The CPU 12, having executed step 112, displays on the displaying means of OPE 20 a second message "Load document" suggesting the insertion of the document according to the program in step 114. The CPU 12, having displayed the second message suggesting the insertion of the document, detects whether or not the document is detected by the document detecting sensor 18 in step 116, and keeps executing step 114 until the document insertion is detected. The document detecting sensor 18 sends a document detection signal to the CPU 12 when the document DOC is inserted through the document guide (not shown). The detection signal of the document detecting sensor 18 can be provided to the CPU 12 as an interrupt signal, and also to the data terminals so as to be read out by the scanning operation.

When the CPU 12 detects that the document is detected by the document detecting sensor 18, the CPU 12 outputs a motor driving data to a motor driving device 22 to have the inserted document (DOC) to be conveyed to the scanning position in step 118. The motor driving device 22 containing the motor driving data conveys on the scanning position, the document D1 to be scanned first among the documents DOC by driving the document conveying motor (not shown) according to the driving data. (The conveyance of the document D1 is performed by a mechanical operation of the facsimile which is not shown).

The CPU 12, having driven the document conveying motor as above, detects whether or not the first document D1 is placed in the scanning position upon detecting the detection signal of the scanning of the scanning position sensor 19.

Thereafter, the scanning position sensor 19 detects if the document DOC reaches the scanning position for providing it to the CPU 12. The scanning position detecting signal can be provided as an interrupt signal of the CPU 12, and also can be connected to a data terminal so as to be read out by the scanning operation of the CPU 12.

If the scanning position sensor 19 could not detect the document, it is because the document D1 to be conveyed by the driving of the document conveying motor is not yet positioned at a scanning position, the CPU 12 then conveys the document by repeating aforementioned step 118. Thereafter, when the scanning position detecting signal is sent from the scanning position sensor 19 in step 120, the document D1, being considered for at the scanning position, is scanned in step 122. The CPU 12 executes the scanning operation by controlling the picture data detecting apparatus 16. The picture data detecting apparatus 16 scans the document by scanning a light 17a across the top from the left to the right of the document D1. The light 17b reflected from the document D1 is inputted into the picture data detecting apparatus 16, which 16 detects picture data by the comparison of the light quantity of the reflected light 17b with a reference light quantity.

The picture data detected as above are sent to the CPU 12 as a digital signal after it is digitalized within the picture data detecting apparatus 16. Thus, the CPU 12 codes the picture data to store to the memory 14 in step 122, and then detects whether or not it is the end of the document in step 124.

The end of the document D1 in step 124 is judged by the output of the scanning position sensor 19. For example, if the output of the scanning position sensor 19 is "high", it is judged the document D1 is in the scanning position, and in case of transition "from high to low", it is judged to be the end of the document D1. If the result of step 124 is not judged to be the end of the document, step 122 is repeated to scan and code the contents of the document D1, and, thereafter, save it into memory 14, repeatedly. The contents of the document is saved in the memory 14 by the operational step 122, by the page.

When the picture data (picture and letter) of the first document inserted D1 among the documents DOC by steps 122 and 124, is completely stored in memory 14, the CPU 12 increases, by one, the contents of the document counter established within the memory 14 in step 126. Then the CPU 12 detects the output of the document detecting sensor 18 to verify whether or not another document D2 is detected in step 128.

When the insertion of another document D2 is detected as a result of step 128, the CPU 12 repeats step 118 and to code the contents of the document D2 and store it in memory 14 by the page. Thereafter the CPU 12 increases the document counter by one. Therefore, when the document DOC is inserted with 3 copies of D1, D2, D3 as shown in FIG. 1, the contents of the document counter according to the step 126 in FIG. 2 become "3" (decimal number), and an amount equal to 3 pages of coding data becomes stored in memory 14 by the page. In case the insertion of another document is not detected at step 128, the CPU 12 stores, by conveying, the contents of document counter established in memory 14 to the "register A" in a step 130.

Thereafter, the CPU 12 decodes, by accessing sequentially, the amount of one page of coding data from memory 14 and sends it to the recorder 24 in a step 132. The recorder 24 produces the output, in printing, by receiving decoding data and the control signal outputted from said CPU 12. The CPU 12 detects whether or not the amount of one page of data is accessed to output, every time one line of decoding data is decoded to output. When the amount of one page of data is completed to access, the system stops the operation of the recorder 24, and cuts the recording paper (not shown) being outputted by the recorder 24 by driving the cutting device 26. Therefore, the contents of the first document D1 of the inserted documents DOC is entirely outputted in a copy.

The CPU 12, having outputted the amount of one entire page, as above-mentioned, decreases the contents of "register A" by one in step 134, and detects whether or not the contents of "register A" is "0" in step 136. In case the detected result of step 136 is not "0", since all the inserted documents (D1, D2, D3=DOC) are not completely outputted step 132 is repeatedly executed by increasing the page by one to have the next page accessed in step 137. Therefore, coded data of the second page document D2 stored within the memory 14 are accessed to output by the aforementioned operation, and the value of "register A" is decreased once more by one.

The value of "register A", decreased by said operation, is re-detected by the aforementioned step 136, and in case the value of "register A" is not "0" in step 136, process of the step 137 and therebelow being carried out, the accessed data of the document D3 of page 3, stored in the memory 14 after being coded, is accessed to output by the aforementioned operation.

When it is judged the value of the "register A" is "0", according to the operation as above, the CPU 12 judges that the all copies are made for each page with respect to the inserted documents DOC: D1, D2, D3, and decreases the copy numbers stored in step 112 by one in step 138.

In step 138, the CPU 12 which is decreased by one from the desired copy number set by the user detects whether or not the copy quantity is "0" at step 140. If the copy number stored in aforementioned step 112, i.e., the copy number a user has set was 3 copies, judging that the copy number is not "0" in step 140, so that the CPU 12 carrys out step 130 repeatedly and therebelow to output the inserted document DOC; D1, D2, D3 in printing. When every 3 copies with respect to each document DOC: D1, D2, D3 inserted by the repeated operation as above are outputted and the setting amount of the copy number inputted becomes "0", the CPU 12 detecting the copy number within the memory 14 judges the data of the copy number to be "0" in step 140 of FIG. 2.

In step 140, when the copy number is judged to be "0" (Zero), the CPU 12 judges the printing to be outputted as much as the copy number, the user desires to make with respect to each of the inserted documents DOC, and it clears the stored data (the coding data of the document picture and the data accompanying) of the memory 14 and transmit to the stand-by mode in a step 142.

As described above, according to the invention, when the desired copy number is set for each of the document inserted into the document guide of the facsimile system, the contents of the inserted documents are scanned and stored into the memory region to be outputted automatically in printing as many times as the setting number indicates. Therefore, there is an advantage that the duplicating function of this system is further enhanced or improved.

Although specific constructions procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A method for making multiple copies in a facsimile system, comprising the steps of:

displaying a first message notifying a user to set a number of copies for each page using a multi-copy key, set in a stand-by state, and detecting whether said number of copies for each page is set;

saving, during a first saving process, in a memory said number of copies, and displaying a second message notifying the user to load an original document until the original document is detected in a first detecting process by a document detecting sensor;

conveying, during a first reading process, the original document into a scanning position upon the detecting the original document in said first detecting process, scanning and encoding the original document to store data representing the original document into said memory by the page, and detecting, in a second detecting process, the end of the original document;

increasing a count by a document counter when the end of the original document is detected in said third detecting process, and detecting, as in said second detecting process, whether another document is inserted;

repeatedly executing, from the document scanning position, said first reading process of conveying, scanning, and encoding and said second detecting process upon detection of another document, until no document is detected, and saving a current count of said document counter in a register during a second saving process;

producing a facsimile document, by accessing and decoding, one page of the data from said memory after completion of said step of repeatedly executing said first reading process;

decreasing the stored content of said register and repeatedly executing, in a third process, said step of producing facsimile documents by accessing and decoding the data by the page until the value of said register becomes "0";

decreasing the number of copies by one after completion of said third process, and detecting, during a fourth detecting process, whether a current value of the number of copies is "0"; and storing the current value of the number of copies when the result of said fourth detecting process is not "0" and then repeatedly producing facsimile documents and clearing the data from memory when the current value is "0", to transmit into the stand-by mode.

2. A method for making multiple copies in a facsimile system, comprising the steps of:

checking, during a stand-by state, for receipt of a first signal;

making a first request for a desired number of copies to be produced upon receipt of said first signal;

signalling, by use of a second signal, said desired number of copies to satisfy said first request;

loading documents to be copied after said first request is satisfied;

scanning and coding data for each of the documents loaded, for storage in a memory device;

decoding and producing a facsimile of each of the documents from the data stored in memory and decreasing said desired number of copies after each document is produced; and returning to the stand-by state after all copies are produced.

3. A method as claimed in claim 2, further comprised of making a second request for each document to be loaded before loading of the documents.

4. A method as claimed in claim 3, further comprised of generating a third signal to notify the facsimile system that a desired number of copies of certain documents is needed.

5. A method as claimed in claim 4, further comprised of determining whether said number of copies is set after said second signal representing said desired number of copies is received.

6. A method as claimed in claim 5, further comprised of storing said desired number of copies in a predetermined memory location after determining if said desired number of copies is set, in order to decrement a current value in the memory location each time a copy is produced.

7. A method as claimed in claim 6, further comprised of performing a step of sensing to determine if the document is correctly loaded after display of said second request.

8. A method as claimed in claim 7, further comprised of detecting the end of said document, increasing a document count, and saving the document count in a register after performing said step of scanning and coding.

9. A method as claimed in claim 8, further comprised of scanning and coding subsequent documents as the subsequent documents are detected and increasing said document count when the end of each document is detected.

10. A method as claimed in claim 9, further comprised of decreasing, by one, the current value of said desired number of copies each time a copy is produced and continuously producing copies of said document until said stored value of said desired number of copies is zero.

11. A method for making multiple copies in a facsimile system, comprising the steps of:

displaying a first message notifying a user to set a number of copies for each page using a multi-copy key, set in a stand-by state, and detecting whether said number of copies for each page is set;

storing, during a first saving process, a prosecution of a number of copies of a document desired by a user, and detecting the presence of an original document during a first detecting process;

during a first reading process, scanning and encoding the original document to store data representing the original document;

increasing a document count when said scanning said encoding the original document is completed during said first reading process, and detecting the process of another document;

repeatedly executing said first reading process of scanning and encoding and said second detecting process upon detection of the presence of another document, until no presence of another document is detected, and storing a current value of said document count during a second saving process;

producing in a first production process a facsimile document, by accessing and decoding the data from said memory after completion of said step of repeatedly executing said first reading process;

decreasing the current value of said document count and repeatedly executing, in a second production process, said step of producing facsimile documents by accessing and decoding the data until the current value is reduced to a preset quantity.

12. The method as claimed in claim 11, further comprised of:

decreasing representation of the number of copies by one after completion of said second production process, and detecting, during a third detecting process, whether a current representation of the number of copies is reduced to said preset quantity.

13. The method as claimed in claim 12, further comprised of:

storing the current representation of the number of copies when the result of said third detecting process is greater than said preset quantity and then repeatedly producing facsimile documents and clearing the data from memory when the current representation is reduced to said preset quantity.

* * * * *

UNITED STATES PATENT AND TRADEMARK OFFICE
CERTIFICATE OF CORRECTION

PATENT NO. : U.S. 5,060,080

DATED : 22 October 1991

INVENTOR(S) : Hyo-Hyun HWANG

Page 1 of 2

It is certified that error appears in the above-identified patent and that said Letters Patent is hereby corrected as shown below:

IN THE ABSTRACT

Line 13, change "eight" to --eighth--;
Title page, item (30) change "Rep. of Korea....2475" to --Rep. of Korea.... 1989-2475--;

Column 1,    Line 17,  change "developement" to --development--;

Line 26,  insert --a-- before "predetermined";

Line 57,  change "coprises" to --comprises--;

Column 2,    Line 19,  change "accopanying" to --accompanying--;

Line 41,  change "outputed" to --outputted--;

Column 3,    Line 8,   change "decresing" to --decreasing--;

Line 11,  change "numbers" to --number--;

UNITED STATES PATENT AND TRADEMARK OFFICE
CERTIFICATE OF CORRECTION

PATENT NO. : U.S. 5,060,080
DATED : 22 October 1991
INVENTOR(S) : Hyo-Hyun HWANG It is certified that error appears in the above-identified patent and that said Letters Patent is hereby corrected as shown below:

Column 4, Line 4, delete "to be";

Line 59, change "contents" to --content--;

Column 6, Line 13, change "document" to --documents--;

Claim 1, Column 6, Line 41, delete "the".

Signed and Sealed this

Ninth Day of February, 1993

Attest:

STEPHEN G. KUNIN

*Attesting Officer*     *Acting Commissioner of Patents and Trademarks*